April 12, 1949.  A. V. SAMPSEL  2,466,914
SEQUENCING CONTROL APPARATUS
Original Filed Dec. 7, 1942  4 Sheets-Sheet 1
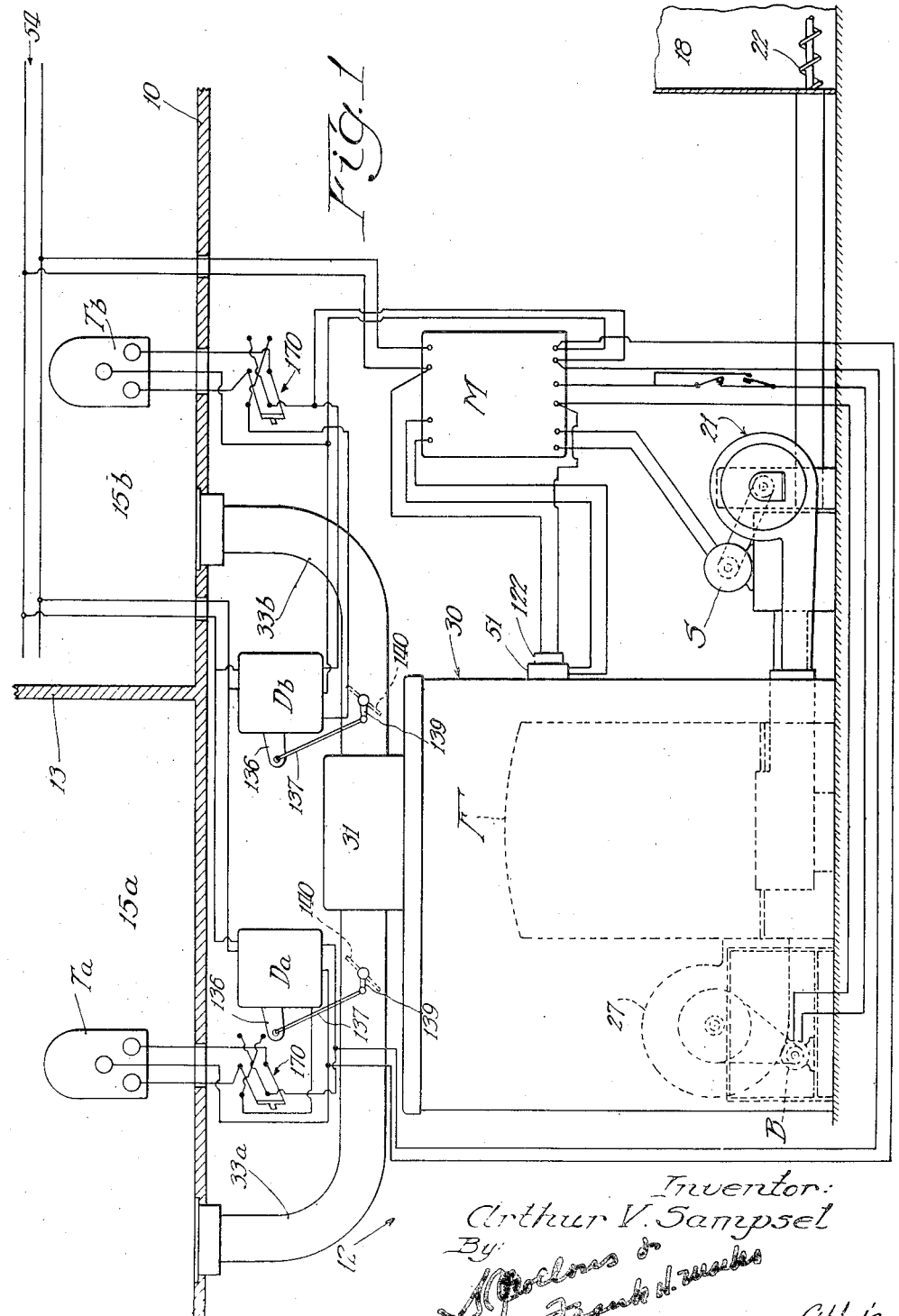

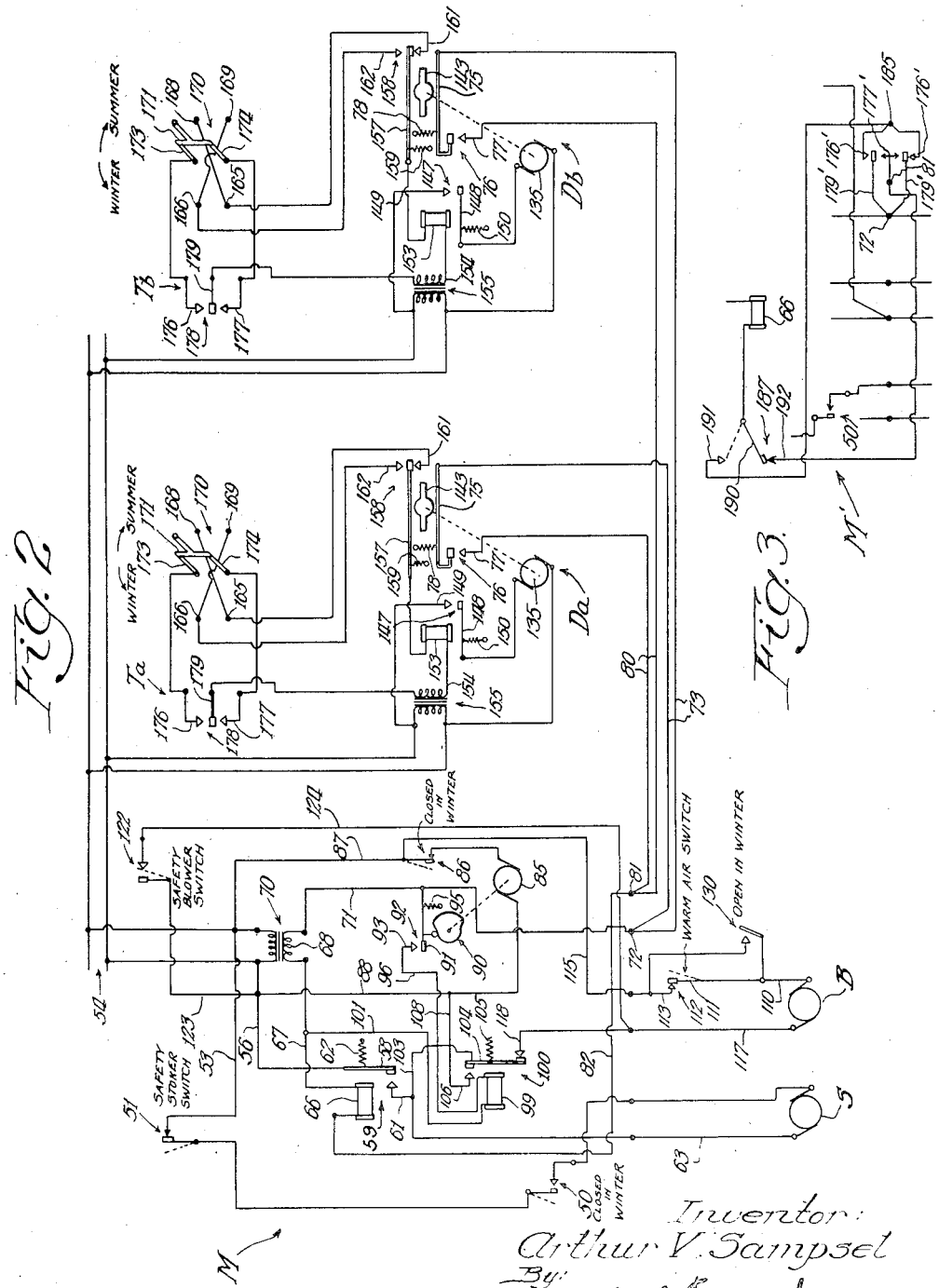

April 12, 1949. A. V. SAMPSEL 2,466,914
SEQUENCING CONTROL APPARATUS
Original Filed Dec. 7, 1942 4 Sheets-Sheet 3
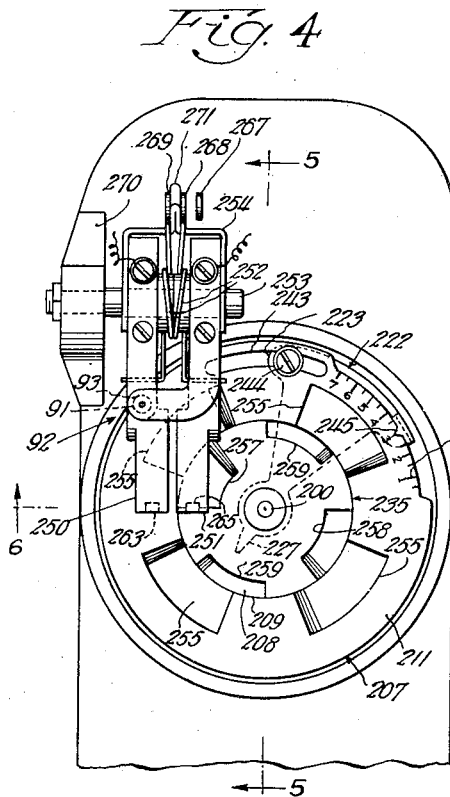
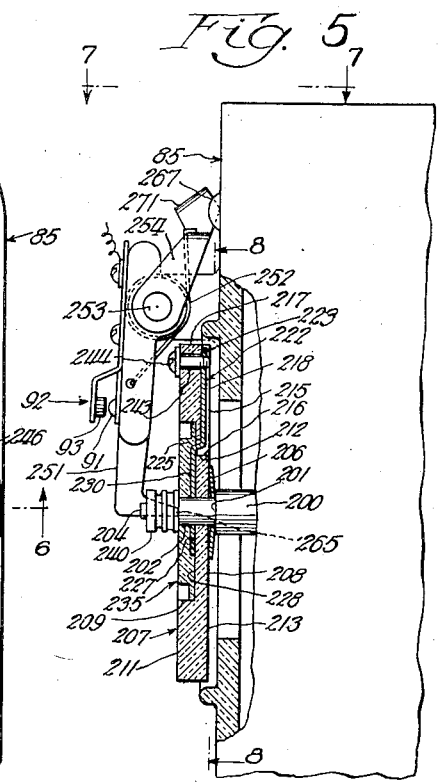
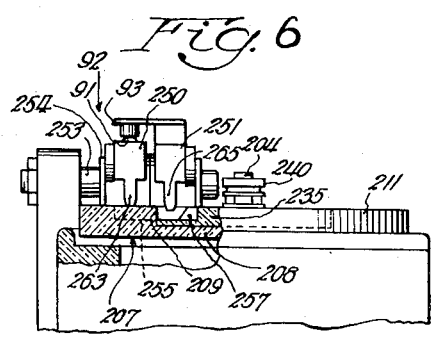
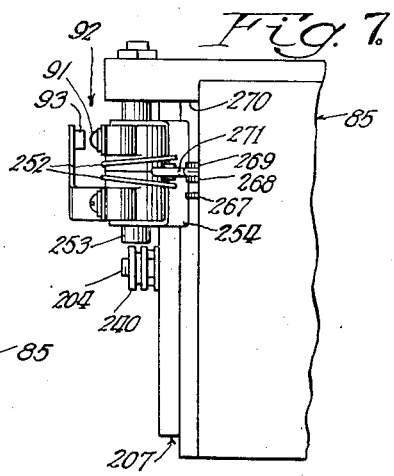
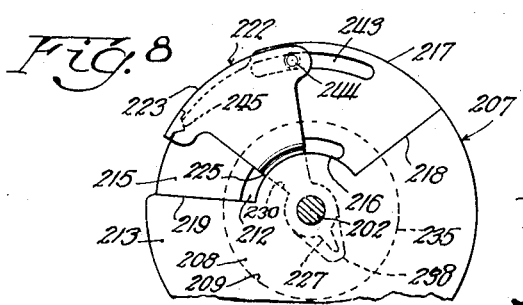
Inventor:
Arthur V. Sampsel April 12, 1949.  A. V. SAMPSEL  2,466,914
SEQUENCING CONTROL APPARATUS
Original Filed Dec. 7, 1942  4 Sheets-Sheet 4
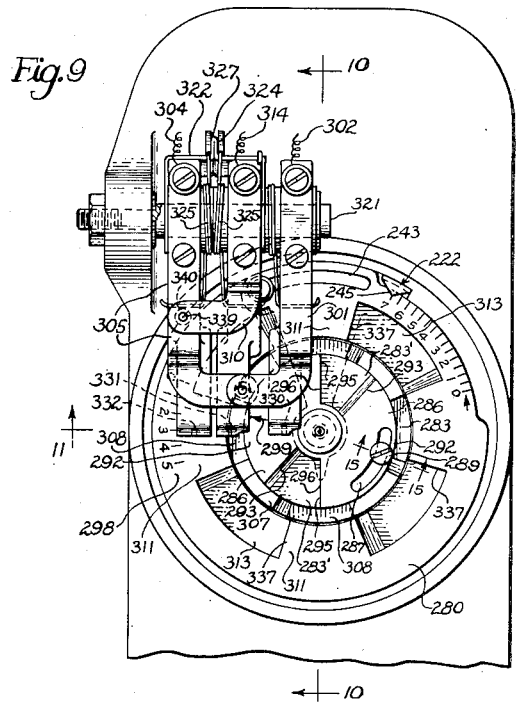
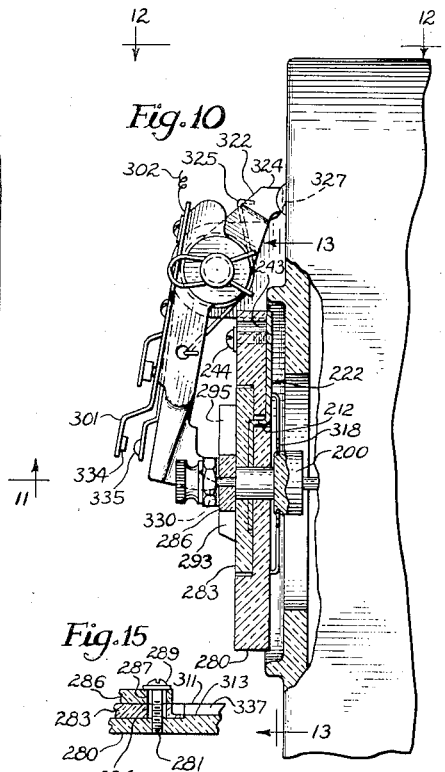
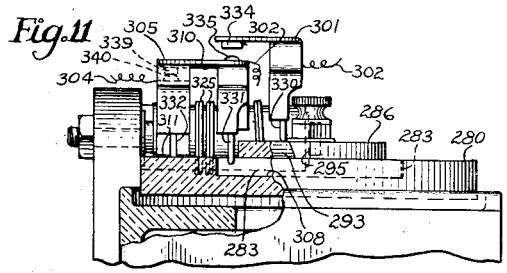
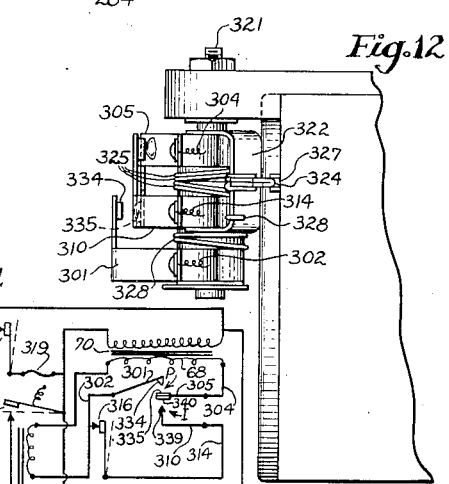
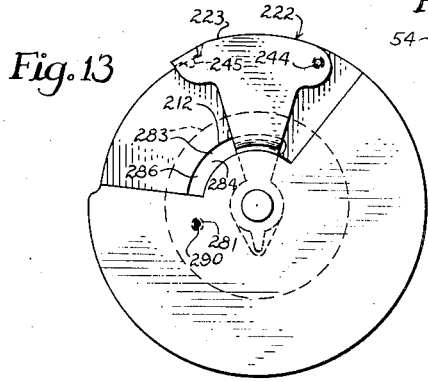
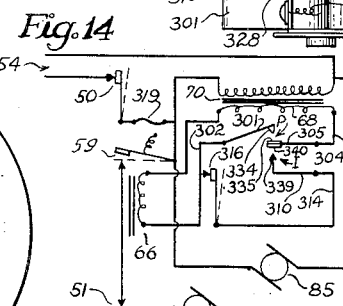
Inventor
Arthur V. Sampsel
by
Attys.

Patented Apr. 12, 1949

2,466,914

UNITED STATES PATENT OFFICE 2,466,914

SEQUENCING CONTROL APPARATUS

Arthur V. Sampsel, Spring Valley, Ill., assignor to Sears, Roebuck and Co., Chicago, Ill., a corporation of New York Division of abandoned application Serial No. 468,069, December 7, 1942. This application January 10, 1947, Serial No. 721,322

8 Claims. (Cl. 200—38)

1

This application is a continuation in part of U. S. Patent No. 2,304,124 and is a division of copending application, Serial Number 468,069 filed December 7, 1942 for "Temperature control" and subsequently abandoned.

My invention relates to control devices and has to do more particularly with the periodic control of electric circuits for heating, cooling and other purposes. It will be found applicable to systems employing air, water or other heat exchange media.

It is one of the objects of my invention to provide fire control mechanism adjustable to feed a furnace from a fraction of a minute, more or less, to seven minutes, more or less, at one, two or four, or at other, intervals per hour or other units of time.

An additional object is to provide a device for rendering the fuel feeding means intermittently operative during a continuous heat demand by the room thermostat, said device constructed so as to be adjustable to various positions in which the same is inoperative or operative at different periods and frequencies.

An additional object involves the provision of a control device adapted to cause intermittent fuel feed to keep the fire alive and also adapted to cause intermittent fuel feed during continuous heat demand by a room thermostat, the device being adjustable for various periods and frequencies.

Further objects and advantages of my invention will appear as the description proceeds.

The invention will be understood upon reference to the following description and the accompanying drawings, in which:

Fig. 1 is a fragmentary vertical sectional diagrammatic view through a building in which is installed a damper-responsive control system embodying features of my invention.

Fig. 2 is a detailed wiring diagram of the system appearing in Fig. 1.

Fig. 3 is a fragmentary diagrammatic view showing how a portion of the wiring of Fig. 2 may be modified to adapt the system to an installation which is not damper-controlled, as well as to one which is damper-controlled.

Fig. 4 is a fragmentary elevation of a fire control clock switch and associated cam mechanism embodying features of my invention.

Fig. 5 is a fragmentary sectional view taken as indicated by the line 5—5 in Fig. 4, showing the switch open.

Fig. 6 is a fragmentary sectional view taken as indicated by the line 6—6 in Fig. 4, but with the parts adjusted so that the switch is closed.

Fig. 7 is a fragmentary plan view taken as indicated by the line 7—7 in Fig. 5.

Fig. 8 is a fragmentary sectional view taken as indicated by the line 8—8 in Fig. 5.

2

Fig. 9 is a fragmentary elevation of a combined fire pilot and thermostat interrupting control embodying features of my invention.

Fig. 10 is a fragmentary sectional view taken as indicated by the line 10—10 in Fig. 9, showing one of the switches open and the other closed.

Fig. 11 is a fragmentary sectional view taken as indicated by the line 11—11 in Fig. 9, but with the parts in a different adjustment.

Fig. 12 is a fragmentary plan view taken as indicated by the line 12—12 in Fig. 10.

Fig. 13 is a fragmentary sectional view taken as indicated by the line 13—13 in Fig. 10.

Fig. 14 is a diagram showing how the form of the invention appearing in Figs. 9 to 13 may be employed.

Fig. 15 is a fragmentary sectional view taken as indicated by the line 15—15 in Fig. 9.

In the drawings, the numeral 10 represents a floor of a building, separating the basement 12 from the living or other quarters, which may be divided by walls such as the wall 13 into enclosures or zones 15a and 15b.

In the basement 12 there is provided a coal bin 18 and a furnace F, which may be of the hot air type, as shown, and adapted for coal burning. An underfeed stoker 21 comprising a screw conveyor 22 extends from the bin to the furnace. A suitable motive means S is provided for operating the conveyor for feeding coal from the bin to the furnace, and a blower or fan 27 is also provided, operated by a motor B.

For illustrative purposes only, I have elected to show and describe a furnace of the hot air type, surrounded by a casing or bonnet 30 communicating through a plenum chamber 31 with air flues or ducts 33a and 33b, whereby warm air in the winter and cool air in the summer, when the furnace is not used, is conveyed to the respective zones or rooms whose temperatures are to be controlled.

Each zone has a thermostat Ta, Tb controlling a damper-control mechanism Da, Db, which in turn operates, in addition to a damper or valve for controlling flow of heat exchange medium to the respective zones, a switch controlling the stoker motor S and the blower or pump motor B through connections and apparatus which may be suitably mounted on a master panel as indicated generally at M. The panel apparatus appears in detail diagrammatically in Fig. 2 and elsewhere.

The winter operation of the apparatus of my invention is substantially as follows: When any zone thermostat calls for heat, the appropriate damper will be opened and cause the stoker S and the blower B to be placed in operation. If thereafter, and before said thermostat has demanded a shutoff, a thermostat in another zone calls for heat, the appropriate damper for such other zone will be opened. However, since the stoker and blower are already in operation no alteration in the performance of these elements will occur. This procedure, of course, will be the same for any number of zones, the demand for heat in any additional zone resulting merely in the opening of the appropriate damper while the stoker and blower continue to operate, so long as at least one thermostat calls for heat. As long as at least one thermostat demands heat, the electrical circuits controlling the stoker and blower will be closed and, therefore, the demand by any other thermostat that heat be shut off will result merely in the closing of the damper corresponding to such other thermostat without affecting the stoker or blower.

In other words, under normal conditions, the stoker and blower will not shut down until all of the thermostats have ordered a discontinuance of heat.

A time fire pilot control is provided to operate the stoker at suitable intervals in mild winter weather to keep the fire from going out.

The above zone and time controls are subject to the following exception, however. In the event that the furnace becomes heated above a predetermined temperature, the electric circuit controlling the stoker will open and will remain open at least as long as said temperature is exceeded. While the operation of the stoker is thus arrested, the furnace temperature may continue to increase, due to fire acceleration or heat from a stimulated fire, for example. In compliance with ordinances, municipal codes, underwriters' requirements and the like, provision may be made for the automatic operation of the blower when a predetermined higher furnace temperature obtains.

To adjust the apparatus for summer operation it is necessary merely to operate a few switches, the effect of which is to disable the stoker and condition the dampers whereupon the blower may supply cool basement or other air to the individual zones as required by the respective zone thermostats. By restoring the original adjustment of the switches, the apparatus is prepared for winter operation.

By a simple expedient, which will appear, the apparatus on the master panel may be adapted for operation with or without damper control, as desired.

The stoker circuit as it is influenced by the zones will be described first. In the stoker operating circuit there is provided a suitable switch 50, Fig. 2 which may be closed during the winter and open during the summer, so that the stoker operates only during the winter. In the same circuit there is provided also a safety or limit control thermostat switch 51 which is adapted to open and thereby stop the stoker when the furnace reaches a predetermined high temperature. A conductor 53 connects the switch 51 to one side of the line voltage 54. From the other side of the line voltage a wire 56 is connected to the blade 58 of a relay 59, said blade being urged away from the relay contact 61 by a spring 62. The contact 61 is connected by a wire 63 to the motor of stoker S, thereby completing the zone-controlled stoker circuit. With winter conditions prevailing, so that the switch 50 is closed, and with the safety switch 51 closed, i. e., when the furnace is not above a predetermined temperature, the operation of the stoker in this circuit is dependent on the closing of the switch of the relay 59.

The winding 66 of the relay 59 is connected by a wire 67 to the low voltage side 68 of a transformer 70 connected to the line 54. A wire 71 connects the other end of the transformer side 68 to a post 72, and a wire 73 extends from the post to the blade 75 of a switch 76 associated with each zone. Each switch 76 has a contact 77. The blade is urged by a spring 78 away from the associated contact 77. Each switch 76 is controlled by a room thermostat, as will be explained in detail. A wire 80 connects each contact 77 to a second post 81, and a wire 82 completes the relay circuit to the relay coil 66.

It is apparent that the switches 76 are connected in parallel, so that when at least one is closed, i. e., when any zone or room demands heat in the winter, the relay coil 66 is energized, causing the blade 58 to engage the contact 61 and thereby close the stoker circuit for operating the stoker, and, as will appear, the blower.

There is likely to be a period from time to time during which the stoker will not be operated by heat demand, as when mild winter weather prevails, and accordingly the fire in the furnace might die. I provide a fire control mechanism for such a contingency. To that end there is provided a synchronous clock 85 which is connected through a manual or other suitable switch 86, closed only in winter, and a wire 87 to one side of the line 54, and by a wire 88 to the other side of the line. Cam mechanism indicated schematically at 90, hereinafter more specifically described, operated by the clock 85, periodically enables the blade 91 of a switch 92 to move into engagement with the contact 93 to close said switch, the blade being urged by a spring 95 away from the contact. A wire 96 connects the contact 93 to the coil 99 of a relay 100, and this coil is connected by a wire 101 to an end of the low voltage side 68 of the transformer 70, the other end being connected by the wire 71 to the blade 91, completing the clock-controlled relay circuit.

It will be observed that the wire 63, connected to the stoker S, is connected to another wire 103 which is connected to the blade 104 of the relay 100, said blade being urged by a spring 105 away from a contact 106 of said relay. A wire 108 connects the contact 106 to that side of the line to which the blade 58 of the zone thermostat-controlled relay 59 is connected. Thus the relay 59 is by-passed when the clock periodically energizes the other relay coil 99, drawing the blade 104 into engagement with the contact 106. The clock may operate the stoker any desired number of times per hour, for example, for any desired duration each time; from, say, fifteen seconds, more or less, to, say, seven minutes, more or less.

The stoker will be operated when either or both of the relay coils 59 and 99 are energized, i. e., when either one or more zones and/or the clock calls for heat, provided of course the stoker safety switch 51 is closed.

The blower B is operative in the winter to deliver warm air and in the summer to deliver cool air. It may be connected by a wire 110 to the blade 111 of a limit control switch 112 which is preferably of the thermostat type and is adjusted to open during winter if temperature of the air in the furnace bonnet is too cool. The contact 113, engageable by the blade 111 when the bonnet air is warm, is connected by a wire 115 to a side of the line 54. A second wire 117 is extended from the blower B and is connected to a back contact 118 on the relay 100. The relay blade 104 is urged by the spring 105 into engagement with the back contact 118, completing a blower circuit through the wire 103, relay switch contact 61 and associated blade 58, and wire 56 to the other side of the line 54.

It has been seen that the zone-controlled relay 59 may operate to run the stoker S. It is now apparent that said relay at the same time may cause operation of the blower B, provided that the air in the furnace bonnet is sufficiently warm to close the air limit switch 112 and further that the clock does not cause the relay 100 to withdraw the blade 104 from the contact 118. Tests have shown that periodic stopping of the blower by the clock has a negligible effect on the temperature of the zones. It will be appreciated that even while the blower is idle the warm air will pass such dampers as may be open and into the heat-demanding zones by natural draft.

It has been pointed out that the switch 51 will be open and stop the stoker at a predetermined maximum furnace or bonnet temperature. The heat from the fuel in the furnace may raise the temperature of the furnace substantially above that at which the switch 51 opens. The furnace nevertheless may have a safe operating temperature range above said predetermined temperature. To prevent overheating, I provide a blower limit or emergency switch 122 which is normally open but is designed to close at the upper limit of said range and to maintain the blower in operation regardless of lack of zone demand and of the clock, to dissipate the heat accumulation in the bonnet until the furnace is cooled to a temperature preferably intermediate the limits of said range, whereupon the switch 122 may open. Zone operation of the blower is not affected by the switch 122, but only by the clock. The switch 122 is connected by a wire 123 to the line 54 and by a wire 124 to the wire 117, thereby by-passing the relay switches containing the blades 58 and 104, respectively, and closing a circuit controlling the blower. In a short time, say about one minute, more or less, the blower will discharge sufficient air to effect the desired amount of cooling and thereby open the switch 122. In the event the dampers are closed during such emergency operation of the blower, the air thus blown will pass by way of the usual clearance between the dampers and the duct walls. Or, such air may discharge through a back pressure by-pass (not shown) to the outside of the bonnet.

In a hot air installation a temperature range or differential of about 100° F. has been found satisfactory, although it is to be understood that the switches 51 and 122 may be adjusted or formed to operate at any temperatures desired or required. For example, the switch 51 may open at a bonnet temperature of 300° F. and the auxiliary switch 122 may close at 400° F. and open at 375° F. When hot water is used, it is desirable to operate the switches 51 and 122 at the same time, a circulating pump being of course used in lieu of a blower. When steam is used, emergency means such as a blow-off valve may be employed so that the switch 122 may be dispensed with.

The operation of the stoker below the stoker cutoff temperature and of the blower below the blower cutoff temperature is dependent on the controls already described.

During warm weather it is desirable to operate the blower to furnish cool air from the bonnet to the various zones, the furnace being of course unheated. Since the low limit air control switch 112 for the blower will be open at such time, I provide a manual or other suitable switch 130 which is maintained open in the winter, so as not to overcome the effect of the opening of the switch 112, but is closed in the summer. At such time the blower limit switch 122 is of course open and the clock idle. The clock switch 92 should be open so that the blade 104 will be engaged with the contact 118. If, when the clock switch 86 is opened for summer operation of the apparatus, the switch 92 happens to be closed, the cam mechanism 90 may be adjusted to open said switch, as will appear. The blower circuit is therefore open and closed only when any one or more of the zone thermostat-controlled switches 76 closes, as has been pointed out.

I provide a simple yet unique control for the damper and switch 76 associated with each zone. This control includes a damper motor 135 operatively connected, through any suitable means, such as reduction gearing (not shown), with a crank arm 136 (Fig. 1) from which a connecting rod 137 extends to a crank arm 139 on a damper valve 140, the arrangement being such that in one stroke of the arm 136 the valve will open fully and in the return stroke the valve will close fully. The damper motor 135 also turns a cam 143 adapted to close the switch 76 by moving the spreader 75 against the action of the spring 78 and into engagement with the contact 77, and also adapted to start and stop the motor, as will appear.

The damper motor 135 is connected to the line 54 and is controlled by a switch 147 having a blade 148 urged away from the contact 149 by a spring 150. This blade is adapted to be moved into engagement with the contact 149 when a relay coil 153 is energized. This coil is connected to the low voltage side 154 of a transformer 155, fed by the line 54. The coil 153 is connected to the blade 157 of a single pole double throw switch 158, a spring 159 urging the blade into engagement with a contact 161 and the cam 143 being operative when moving the blade 75 of the switch 76 to also move the blade 157, against the action of the spring 159, into engagement with the contact 162. These contacts lead respectively to winter poles 165 and 166 at one side, and to summer poles 168 and 169 at the other side, of a double pole double throw switch 170, said switch comprising an arm 171 having blades 173 and 174 engageable with the first pair of poles 166 and 165 in the winter and with the second pair of poles 168 and 169 in the summer. The switch blades 173 and 174 are connected respectively with the contacts 176 and 177 of a single pole double throw thermostat 178, the movable blade 179 of which is connected to the low voltage side 154 of the transformer 155, completing various circuits including the relay coil 153. The blade 179 is adapted to engage the contact 176 when heat is not demanded in the winter and when cooling is demanded in the summer, and to engage the contact 177 when heat is demanded in the winter and when cooling is not demanded in the summer.

The operation of the damper control will now be described, first for winter conditions and then for summer conditions.

In the winter, the blades 173 and 174 are engaged with the poles 166 and 165, respectively. Let it be assumed that the zone under consideration is not demanding heat. At such time the thermostat blade 179 is engaged with the contact 176, and the damper is closed, the spreader cam 143 being in its inoperative position so that the switch 76 is held open by the spring 78 and the blade 157 is engaged with the contact 161. The cam should not be turning under such conditions because if it were it would cause the switch 76 to close and cause the stoker and blower to operate when heat is not wanted in the zone. It will presently appear that with the circuit arrangement referred to the cam under such conditions remains in an inoperative position.

Under the conditions just stated, in order for the cam 143 to be idle, the switch 147, controlling the damper motor 135, which runs the cam, must be open and hence the relay coil 153, controlling the switch 147, must not be energized. This coil is in a circuit which includes the blade 157 and contact 161, contact 165, blade 174 and thermostat contact 177, but since the contact 177 is not engaged with the blade 179, the coil circuit is open, so that the switch 147 is open and hence the damper motor 135 and cam 143 are idle.

Now let it be assumed that the zone requires heat. The thermostat blade will snap into engagement with the contact 177, so that, following through the relay coil circuit from that point in the next previous paragraph, the circuit continues from the contact 177 through the blade 179 and low voltage side 154 of the transformer 155 back to the coil 153 and hence the circuit is closed. The coil accordingly closes the switch 147, starting the damper motor 135 and cam 143. The damper motor opens the damper while the cam closes the switch 76 and disengages the blade 157 from the contact 161. As will be seen, this disengagement opens the relay coil circuit and hence the damper motor switch 147 opens, stopping the damper motor. The parts are so arranged that this disengagement occurs just at or after the closing of the switch 76, so that the opening of the damper will be completed and the cam will stop at a position where it maintains the switch 76 closed against the action of the spring 78 and maintains the blade 157 in engagement with the contact 162 against the action of the spring 159.

With the thermostat blade 179 engaged with the contact 177 and the blade 157 engaged with the contact 162, the relay coil circuit extends from the coil 153 through the blade 157, contact 162, contact 166, blade 173 to thermostat contact 176 which is free of the thermostat blade 179, so that the relay coil circuit is open, Q. E. D.

The switch 76 being now closed, the stoker control relay coil 66 is energized and the relay switch blade 58 moved into engagement with the contact 61, starting the stoker S. The warm air limit switch 112 will be closed if the air in the bonnet is sufficiently warm, as it is likely to be. In any event, the furnace will heat the air quickly, so that this switch will close in a minute or two and thus operate the blower.

As has been pointed out, under normal conditions, when the pilot fire control, i. e., the clock, operates the stoker S, the blower does not operate, and this condition is naturally desirable when no heat is needed. If the zone at such time should be demanding heat its damper will be open so that there will be some delivery of warm air by natural draft. In cold weather the clock adjustment is preferably such as to operate the stoker sparingly inasmuch as the zones will make adequate demands on the stoker to keep the fire from dying. Consequently the stoppages of the blower by the clock will be of such short duration as not to appreciably affect the comfort in the zones. When the weather is relatively mild the clock adjustment preferably will be such as to operate the stoker more often or for longer periods because of the corresponding paucity of the zone demand for stoker operation, and at such times it is accordingly desirable that the blower be idle, the dampers being closed.

The delivery of warm air will be continued until the switch 76 opens, and, as will be explained, this will occur when the thermostat 178 stops calling for heat, for then the thermostat blade 179 will separate from the contact 177 and become engaged with the contact 176.

It will be recalled that the damper motor 135 and the cam 143 stopped with the switch 147 open, the damper open and the cam holding the switch 76 closed and the blade 157 free of the contact 161 and in engagement with the contact 162, and because the thermostat blade 179 was separated from the contact 176, the circuit of the relay coil 153 was open. Now, however, that the thermostat blade 179 has become engaged with the contact 176, the circuit of the relay coil 153 is closed since it runs from said coil through the blade 157, contact 162, contact 166, blade 173, thermostat contact 176, thermostat blade 179, low voltage side 154 of the transformer 155 and back to the coil 153. Accordingly, when the thermostat blade 179 engages the contact 176 and the coil 153 is energized, closing the damper motor switch 147 against the action of the spring 150, starting the damper motor 135 and cam 143. The cam turns, allowing the spring 78 to open the switch 76 and thereafter the spring 159 to withdraw the blade 157 from the contact 162, thereby opening the coil circuit so as to deenergize the coil 153 and allow the spring 150 to open the damper motor switch 147. When the damper motor stops, the damper is closed and the cam is in inoperative position, and since the switch 76 is now open, the stoker control relay coil 66 is deenergized and the relay switch 58 is open, so that the stoker and blower are both stopped. Now the conditions are the same as at the beginning of the cycle of operation just explained.

Thus it is clear that in the winter heat will be supplied to any zone demanding it, regardless whether any other zone is demanding it, and that heat will not be supplied to any zone not demanding it; that provision is made against the delivery of air unless it is of the desired minimum temperature; that the fire will not go out even though heat may not be demanded for a long period; that the stoker will stop when the furnace temperature exceeds a predetermined high temperature, the furnace being allowed to be heated by the fuel therein to a higher temperature limit, as when hot air is the heat exchange medium; that at such upper limit the blower will be turned regardless of lack of zone demand for heat, to preclude overheating of the furnace and will cool the furnace to a safe temperature before being turned off; that the blower will supply heat substantially whenever demanded, and the clock cannot operate the stoker nor prevent operation of the blower while the furnace is within a predetermined temperature range. When hot water is the medium, emergency cooling of the furnace starts immediately upon stopping of the stoker at a predetermined high temperature. When steam is the medium, emergency operation of a blow-off valve will take care of the situation.

In the summer, the switch 50, controlling the stoker S, is thrown and maintained open, so that the stoker and hence the furnace are not in operation. The stoker limit switch 51 is closed but of course ineffectual, and the blower limit switch 122 is open. The clock switch 86 is open so that the clock is stopped. The switch 130, however, is closed, and since it is in parallel with the air limit switch 112, it is immaterial whether the latter is open or closed. Now it will be observed that there is a blower circuit extending from the blower through the switch 130 to one side of the line 54, from the other side of the line to the relay switch blade 58, associated contact 61, wire 103, blade 104, held engaged with contact 118 by spring 105, and wire 117 back to the blower. Thus the closing of this circuit is dependent upon the positions of the blades 58 and 104. The blade 104 is moved from the contact 118 when the coil 99 is energized. To preclude such energization the clock-operated cam mechanism 90 is adjusted when the clock is stopped, so as to open the switch 92 controlling said coil. Accordingly in the summer the blower circuit is dependent on only the switch blade 58, which is controlled by the relay coil 66 which is controlled by any zone switch 76. This switch is closed when the zone associated therewith needs cooling and is open when cooling is not demanded, as will appear.

Upon the arrival of summer the stoker and blower will not be called upon at all for the supply of heat. When there is no demand for heat, it has been seen that the thermostat blade 179 is engaged with the contact 176, the damper motor 135 is stopped with the damper closed, and the switch 147 accordingly open and the cam 143 in inoperative position so that the switch 76 is open and the blade 157 engaged with the contact 161, winter-summer switch handle 171 being of course in its winter position, with its blades 173 and 174 respectively engaged with the contacts 166 and 165.

With this arrangement prevailing, no closing of the switch 76 can occur unless heat is demanded. It is desirable to furnish the zones with cool air during the summer, and that is made possible by the system I have provided, merely by throwing the switch handle 171 to its summer position, when the blades 173 and 174 respectively engage the poles 168 and 169. For the purpose of explaining a cycle of summer operation, let it be assumed that, when the switch handle 171 is thrown as just noted, the zones are comfortably cool so that none is demanding to be cooled. As the operation of all zones is the same, it will suffice if reference is made to but one zone.

It has been pointed out that in the summer the thermostat blade 179 is engaged with the contact 176 when cooling is demanded and with the contact 177 when cooling is not demanded. With the blade 179 engaged with the contact 177, the circuit of the relay coil 153 extends from one side of said coil through the blade 157, contact 161, pole 165, pole 168 and blade 173 to contact 176, which is free, so that the circuit is open and hence the coil is not energized, the switch 147 is open, the damper motor 135 and cam 143 are idle, the damper remains closed, the blade 157 continues engaged with the contact 161 and the switch 76 remains open so that the blower B is not in operation.

When the zone demands cooling, the thermostat blade 179 leaves the contact 177 and engages the contact 176, so that the above-referred to relay circuit continues from the contact 176, through the blade 179, low voltage side 154 of the transformer 155 and back through the coil 153, closing its circuit. The coil thus energized closes the damper motor switch 147 against the action of the spring 150, closing the damper motor circuit so that said motor and the cam 143 commence turning, the motor opening the damper and the cam operating to close the switch 76 and then to separate the blade 157 from the contact 161, breaking the circuit of the relay coil 153, allowing the spring 150 to open the damper motor switch 147, stopping the motor with the switch 76 closed and the blade 157 engaged with the contact 162. Closing of the switch 76 closes the circuit of the relay coil 66 which, thus energized, draws the blade 58 into engagement with the contact 61, closing the blower circuit. The blower B operates, supplying the cool air in the bonnet to the zone.

When the zone has cooled sufficiently, the thermostat blade 179 leaves the contact 176 and engages the contact 177. Then the circuit of the relay coil 153 is closed, the current flowing from the coil through the blade 157, contact 162, pole 166, pole 169, blade 174, thermostat contact 177, thermostat blade 179, low voltage side 154 of the transformer 155, back to the coil 153. Thereupon the coil 153 is energized, closing the damper motor switch 147 against the action of the spring 150, starting the damper motor 135 and cam 143, the motor turning the damper toward closed position and the cam allowing the spring 78 to open the switch 76, stopping the blower B, and allowing the spring 159 to move the blade 157 away from the contact 162, thereby deenergizing the coil 153 so as to permit the spring 150 to open the switch 147, stopping the motor 135 with the damper closed and the cam in inoperative position. This completes the cycle of summer operation, and it will be observed that the blower will operate and deliver cool air as long as any one or more zones demand it, and only to the zone or zones demanding it.

When winter comes, the switch handle 171 is moved to its winter position, where its blades 173 and 174 respectively engage the poles 166 and 165, the stoker controlling switch 50 is closed, the clock controlling switch 86 is closed and the switch 130 is opened. The winter cycle has already been explained.

It will be appreciated that if the heating medium be water or any other substance the member B could be a pump and there would be a water jacket, for example, instead of a bonnet, pipes instead of ducts, and radiators or unit heaters in the respective zones, as will be appreciated by those skilled in the art.

In Fig. 3 I have shown at M' a unit like the unit M but having an additional binding post 185 and a single pole double throw switch 187 whose blade 190 is operative through contacts 191 and 192 to connect the posts 81 and 185 alternatively to the relay coil 66. The unit M, above described in detail, employing only the posts 72 and 81, is used when the stoker and blower are controlled by the damper motors associated with the various zones, so that only one thermostat per zone is necessary. The unit M', however, is adapted for an installation where the stoker and blower are independent of the damper motor, as well as for one in which the stoker and blower are damper motor controlled. In the former type of installation, each zone has two thermostats, one to control the damper in a separate thermostat-damper motor circuit (not shown) and the other to control the stoker and blower independently of said circuit and through said unit M', employing said additional post 185 and said switch 187. In such case the contact 176' of each zone thermostat is connected to the post 185, the contact 177' to the post 81, and the thermostat blade 179' to the post 72, and the switch blade 190, which preferably is of the manual type, is connected in the summer with the contact 191 and hence with the thermostat blade 179', and in the winter with the contact 192 and hence with the thermostat contact 177'.

Now, when the temperature of a zone is too great the thermostat blade 179' engages the contact 176', and when heat is demanded the blade engages the contact 177'. In the winter, the contact 176' is disconnected from and the contact 177' is connected to the relay coil 66, so that the coil is energized only when the blade engages the contact 177', to operate the stoker and blower, subject to the conditions noted above relative to clock and limit control operation. In the summer, the stoker is inoperative, so that the coil 66 is employed to operate the blower, the contact 176' being connected to and the contact 177' being disconnected from the relay coil, so that the coil is energized only when cooling is demanded. As in the case of the damper motor controlled installation, it will be observed that the stoker and blower-controlling thermostats in the various zones are all connected in parallel so that as long as there is a demand for heat in the winter or cooling in the summer, whether from only one or from more than one zone, the apparatus will function to supply such demand, the damper thermostat in each such demanding zone operating to open the associated damper to conduct the blown air into such zone.

When the unit M' is used with damper control, the switch blade 190 will be at all times engaged with the contact 192 and the switches 76 connected to the posts 72 and 81, as shown in Fig. 2.

The clock-operated cam mechanism for opening and closing the stoker-controlling switch 92 is operated at intervals which preferably may be varied as to number and duration. For example, in mild winter weather it naturally will not be necessary to run the stoker as often or for as long periods as in colder weather. In the illustrated embodiment of my invention, I have shown by way of example a cam mechanism which, in a given period such as one hour, may operate the stoker one, two or four times, for anywhere from about 15 seconds, more or less, to about seven minutes, more or less, each time. Thus the clock may operate the stoker throughout a range of from one 15 second period per hour to four seven minute periods per hour. It is to be understood that although in the ensuing description, reference is made specifically to the mechanism making possible the variations just mentioned, the same principles may be employed to provide for clock operation of the stoker any desired fractional or integral number of times including three or above four and for any desired duration above seven minutes each time, per hour or per any other desired period.

Referring now more particularly to the embodiment of the fire pilot control unit featured in Figs. 4 to 8, inclusive, attention is now directed to the reference numeral 85, which designates the supporting base. A synchronous motor, not shown, is provided with appropriate reduction gearing to rotate the hour shaft 200 so that it will make precisely one revolution every sixty minutes. The shaft 200, Figs. 4 and 5 is shouldered at 201 affording a reduced diameter portion designated 202 on which is supported a surface cam assembly 207 between the tensioning spring washer 206 and the lock nut 240, threaded upon a further reduced and threaded portion 204 of shaft 200.

The cam assembly 207 is made of two principal parts, one of which will be referred to as the primary portion 211 and the other as the secondary portion 235. The primary portion 211 is provided with an arcuate recess on its rear face designated 215, Fig. 8, describing approximately 145° between its radial defining edges 218 and 219. The recess extends inwardly to the radius wall 216. A coaxial slot 212 coincident with the defining wall 216 extends through the disc connecting with the concentric circular surface recess 209 on the front face of the cam disc 207.

From Figs. 4 and 8 it may be observed that the periphery of cam 207 is substantially circular, except for a shallow depression beginning with the radial defining line 219 and extending to a point about half way in the direction approaching the other radial line 218. This peripheral clearance is provided to accommodate a transversely extending pointer arm 245 which is integral with a triangular plate 222 pivoted on the reduced shoulder portion 202. The innermost extremity of plate 202 is sandwiched between the thin hub face 229 and a small cam disc 235 which is especially formed to accommodate the innermost extremity 230 of the triangular plate 222. In this manner cam disc 235 is integrally associated with the plate 222 so that the two of them move in unison during adjustment which may partake of any position within the angle, roughly 72°, as afforded by the peripheral clearance to the pointer arm 245 and is also afforded by the radial notch 212 to the offset portion 225 of plate 222 that extends therethrough.

Once a desired adjustment is established, the triangular plate 222 may be anchored to the main disc 207 by drawing up the securement screw 244 that extends through another transverse slot 243 in the disc 207 as clearly shown in Figs. 4, 5 and 8. Thus are described the structural details of the cam disc 207 and its manner of adjustment for affording variation in the time duration of certain ones of its surface cam depressions. This adjustment affords a means of varying the operation interval during which the stoker S will run when the contact pair 92 is closed by the fire pilot timing clock. There will now be explained the various details concerning the cam follower mechanism which is carried upon shaft 253, and which in the embodiment featured in Figs. 4 to 8 includes two follower projections 263 and 265.

Calling attention now to Fig. 4, it is to be observed that the small cam disc 235 is divided quadrilaterally into four radial cam depressions, two of which are designated 257 and 258 at 180° from each other and the other two of which are both designated 259 at the intervening 180° from each other. Cam depressions 259 are located at the outermost trackway on the surface of disc 235 and extend only into a single zone width towards the center of the disc. Cam depression 258 has approximately twice the width of the cam depressions 259, while cam depression 257 has approximately three times the described width. The radial extent of each of the four cam surfaces is about the same, being roughly 45°, and since the cam assembly rotates in a counter-clockwise direction, each cam recess is provided with an ascending slope on its trailing edge so that the follower projection 265 may ride out of the depressions onto the outer surface of disc 235.

When the follower 265 is disposed in its left-hand extreme position, as viewed in Fig. 4, it will ride into and out of all four of the cam recesses 257, 258 and the two 259's affording thereby four operations to the control function of stoker drive per hour. When moved rightwardly on shaft 253, the follower assembly will ride into and out of the cam depressions 257 and 258 only, missing the cam depressions 259 and affording thereby two operations per hour at one-half hour intervals. When the follower is moved to its extreme right-hand position projection 265 will ride into the depression 257 solely, missing the other three depressions 258 and 259 and affording thereby but one operation per hour.

The follower projection 265 is carried upon an arm 251 of electric insulation material pivoted, as has already been said, on the stud 253. A torsion spring 252 of which two symmetrically opposite ones are provided, imparts counter-clockwise, Fig. 5, rotation to the arm 251, as well as to the contact extension mounted thereon and carrying the contact point 93.

The principal cam surfaces which are located in disc 207 are also four in number, all designated 255, each partaking of the same width and depth in contradistinction from the cam recesses of disc 235, and this depth is sufficient to permit the follower projection 263 to ride in and out of each cam depression throughout the three adjustment positions of the follower assembly made to accommodate the variations of the internal cam disc 235. Accordingly therefore the follower lever 250 operates four times an hour, regardless of the adjustment and operation of the follower lever 251. Also it is to be noted that follower lever 250 carries contact point 91 which is maintained in registering alignment with the contact point 93 by virtue of the fact that the two levers 250 and 251 are separated by spacing collars between them on shaft 253 and are constrained against separation by the yoke 254 which is made of sheet metal and which is provided with a manipulation handle 271.

A number of retaining projections 267, 268 and 269 integrally associated with the case 85 are provided with predetermined spacing between them for the purpose of receiving the manipulation portion 271 and for restraining the yoke 254 thereby against inadvertent longitudinal movement on the shaft 253. It is to be noted that the tail ends of the torsion springs 252 which urge the levers 250 and 251 counter-clockwise rest against the yoke 254 urging the latter member clockwise, as viewed in Fig. 5. The effect of loosening the adjustment screw 244 and of rotating the disc 235 together with its index or pointer 245 relative to the outer cam 207 is to vary the relationship of each cam depression 255 with its associated cam depression 257, 258 or 259, all adjustments being simultaneous. This relative adjustment is translated in terms of radial graduations 246 engraved on the surface 211 of plate 207 so as to represent minutes of time during each quadrant when the contact pair 91—93 will remain closed. In this way the duration of the operating interval may be regulated between one-half and seven minutes per quarter. For a greater operating interval of course it is but necessary to provide that the adjustment angle be proportionately wider, which it may be, up to a maximum just short of fifteen minutes. By cutting down the number of operations per hour, this angle may be increased still more as required.

In order for the contact pair 91—93 to be closed, the follower projection 265 must ride into a surface recession of its cam 235, while the follower projection 263 is held out of its surface recessions in plate 207, it following from this statement that contact engagement is not had during those intervals when both followers 263 and 265 are riding similar surfaces, that is to say, high spots or low spots in their respective cams.

It is to be observed that in accordance with the structural features of the fire pilot control mechanism thus described, the stoker will be operated at regular intervals when no heat demand signals are transmitted from the room or zone thermostats and that the frequency and duration of these intermittent operations may be regulated by two adjustments, one being on the cam and the other on the follower levers. There will now be described a modified form of pilot control mechanism in which all of the adjustments are carried by the rotary cam device.

Attention will now be directed to Figs. 9 to 14, inclusive, wherein there is featured a modified form of fire pilot control mechanism characterized by the provision of an additional cam surface and follower lever for achieving the objectives of fire piloting. The reference numeral 200, as in the case of the preferred embodiment above, designates a synchronous motor driven hour shaft that is designed to make one complete revolution every sixty minutes. The principal cam designated 280 is in this instance also a disc made of electric insulated material in which is provided a surface recess for nesting the circular disc insert cam 283. An adjustment index 245 carried by a similar triangular plate 222 is also provided, but in addition, a third cam disc indicated 286 is superimposed upon the surface of cam disc 283 and is made angularly adjustable with respect thereto throughout a limited arc as afforded by the elongated arcuate slot 287 and the adjustment screw 289.

As will be observed from Figs. 9 and 10, cam disc 286 is provided with two surface depressions designated 283', each defined by a drop-off edge 296 and an inclined rising edge 293. The disc cam 283 is provided with four equally spaced peripheral surface depressions designated 308 and the principal disc cam 280 is provided with four identical surface depressions 313. The adjustment between disc 283 and the principal cam disc 280 is made in the same manner as in the preferred embodiment, while the adjustment between cam disc 286 and its supporting cam disc 283 requires to be made by manual rotation of disc 283, while the tightening screw 289 is released. The three follower levers 301, 310 and 305 are pivoted on the stud 321 but in this case are confined against longitudinal displacement thereon. Lever 301 has a follower projection designated 330 for riding in and out of the cam surfaces of disc 286, which it does twice during every revolution at 180° intervals.

Lever 310 is provided with a follower projection 331 which rides the surface depressions of disc 283, describing four operations during a cycle while lever 305 having a projection 332 similarly rides in and out of the four cam recesses 313 of disc 280.

At this time it is well to keep in mind that the additional achievement of the modified embodiment is to obtain an interruption in the fuel feeding operation during continuous demand periods of the room or zone thermostats. This condition is achieved by a wiring installation as featured in Fig. 14. It is highly desirable to provide this safeguard because on occasions, due to various characteristics of the fuel and of heating conditions, the residual heat in the fuel bed is sufficient to bring the temperature up to a point where the thermostat circuit will open during the interruption interval. With certain varieties of coal which are less inclined to form clinkers, the practice of frequent interruptions has been found to improve the clinker characteristic, thereby affording an over-all preferred firing performance. Where the fuel feeding device operates continuously throughout the period of thermostat demand, and the furnace temperature is permitted to increase and overrun the heat calling cycle, the clinker characteristic is impaired and ofttimes the room temperature is permitted to rise perceptibly beyond the desired levels.

In view of the cam and follower mechanism already described in Figs. 9 to 14, it will be observed that lever 301 carries a contact arm terminating with the contact point 334, that lever 305 carires a contact arm terminating with the contact point 335 as well as with an additional contact point 339, and that the intermediate lever 310 carries an arm having contact point 340. Contact points 334 and 335 are in contactual alignment while contact points 339 and 340 are in contactual alignment. These contact pairs may engage each other when their respective follower projections 330 to 332, inclusive are at variance, that is to say, when one rides an apex and the other a recession in their respective cams.

By referring now to Fig. 14, it will be seen that contact point 334 is connected over a line 302 to the energizing winding 66 of the fire demand call relay whose contact pair 59 controls the operating motor of stoker S and that the opposite terminal of the winding of this relay 66 is connected to the secondary winding 68 of a transformer 70. Also the opposite terminal of transformer winding 68 is connected over a line 304 to the contact points 340 as well as 334. The third contact 339 is connected over a line 314, with the contact pair 316 of a room thermostat so designed as to close in response to low room temperature, thereby establishing a heat demand.

Accordingly the heat demand period is interrupted by the separation of contact pair 339 and 340. This result will occur when the follower 32 drops into a recess 313 while the follower 331 remains out of its recess 308. At all other times the contact pair 339—340 remains closed and permits the heat demand signal to be effective upon the motor of stoker S.

The cooperation between contact pair 335 and 334 is precisely the same as that of contact pair 91 and 93 in the preferred showing of Figs. 4 to 8 inclusive, except that in the particular embodiment only two depressions are provided in cam 286 illustrating an adjustment for foreshortening two of the periodic intervals, it being obvious that all four of the intervals may be correspondingly regulated by providing the appropriate number of recesses 283 in cam 286.

While the present invention has been explained and described with reference to a particular embodiment, it will be obvious to those skilled in the art that numerous variations may be incorporated within its scope. I therefore do not wish to be limited to the specific language employed nor by the illustrations in the drawings except as qualified in the hereunto appended claims.

The invention claimed is:

1. A sequencing switch for fire piloting operations comprising a plurality of concentric cam discs angularly adjustable each to each and frictionally mounted upon a timed rotary shaft, said discs each having a system of circular cam surfaces on a side face thereof with the side faces of all of said discs being in substantial planar alignment, a plurality of cam disc followers each for one of said discs with all followers mounted on a common pivot, piloting control contacts identified with said followers so as to be opened and closed in accordance with the variations of position assumed by said followers relative to each other, means for varying the timing of said pilot contacts by axially displacing said cam discs in relation to one another, and means for further varying the timing of said piloting contacts by shifting said followers on their common pivot.

2. A sequencing switch for fire piloting operations comprising an assembly of cam discs angularly adjustable each to each, said assembly being frictionally mounted upon a shaft which is rotated at a predetermined rate, said discs each having a system of circular cam surfaces on a side face thereof with the side faces of all of said discs in substantial planar alignment, a plurality of followers each for one of said discs and all mounted on a common pivot, piloting control contacts operated by said followers so as to open and close in accordance with the variations of position assumed by said followers relative to each other, means for varying the periodicity in the timing of said piloting contacts by axially displacing said cam discs in relation to one another, and means for varying the frequency of said timing by shifting said followers on their common pivot.

3. A device for automatically controlling fire pilot operations comprising a plurality of concentric cam discs mounted upon a timed rotary shaft and angularly adjustable each to each, said discs each having a system of circular cam surfaces circumferentially spaced on a side face thereof, a plurality of cam disc followers mounted on a common pivot, piloting control contacts actuated by said followers so as to be opened and closed in accordance with contrasting positions assumed by said followers relative to each other, means for varying the timing of said pilot contacts by axially displacing said cam discs in relation to one another, and means for further varying the timing of said piloting contacts by shifting said followers longitudinally on their common pivot.

4. A sequencing switch for fire piloting operations comprising composited concentric cam discs angularly adjustable each to each and frictionally driven by a rotary shaft, said discs each having a system of circular cam surfaces on a side face thereof with the side faces of all of said discs being in substantial planar alignment, a cam disc follower for each of said discs and all followers mounted on a common pivot, piloting control contacts identified with said followers so as to be opened and closed in accordance with the variations of position assumed by said followers relative to each other, means for varying the periodicity in the timing of said piloting contacts by axially displacing said cam discs in relation to one another, and means for varying the frequency of said timing by displacing said followers on their common pivot.

5. A sequencing device comprising a plurality of annular cam rings having related cam surfaces in radial as well as in substantial planar alignment, means for adjusting said rings axially relative to each other and thereby varying the relationship between radially related cam surfaces thereof, a contact controller tracking each of said cam rings, a common pivot shaft mounting all of said controllers longitudinally of said shaft for thereby associating said contact controllers with different cam surfaces of said rings.

6. A motor driven sequencing switch for piloting heat control apparatus comprising a speed regulated rotary power source, a composited cam assembly driven by said source comprised of an outer or primary annular face portion and inner or secondary annular face portions, said face portions being disposed in substantial planar alignment and each having a circular system of cam depressions radially related to cam depressions of a circular system of another of said face portions, means for establishing various angular adjustments between said primary and said secondary face portions, and a plurality of circuit control contact operating members each responsive to a related one of said circular systems of cam depressions for closing and opening heat control circuits during time intervals varying in length according to said angular adjustment between said primary and said secondary face portions.

7. A sequencing switch for piloting heat control apparatus comprising a speed regulated rotary power source, a cam assembly driven by said source comprised of an outer or primary annular face portion and inner or secondary annular face portions, said outer and inner face portions being disposed in substantial planar alignment and each having a circular system of cam depressions, means for adjusting said primary and said secondary face portions axially, and a plurality of contact operating members each responsive to a related one of said circular systems of cam depressions for closing and opening heat control circuits for thereby varying the time intervals of heat piloting according to said angular adjustment between said primary and said secondary face portions.

8. In a heat control system, a sequencing device comprising a plurality of annular cam rings having pluralities of cam surfaces in substantial planar alignment, means for adjusting said rings axially relative to each other for thereby varying the relationship between corresponding cam surfaces thereof, a contact lever following the circular path of each of said cam rings, a common pivot shaft mounting all of said contact levers, and means for shifting all of said levers longitudinally of said shaft for thereby associating said contact controllers with different cam surfaces of said rings to affect periodicity variations.

ARTHUR V. SAMPSEL.

REFERENCES CITED

The following references are of record in the file of this patent:

UNITED STATES PATENTS

| Number | Name | Date |
| --- | --- | --- |
| 2,429,084 | Woodson | Oct. 14, 1947 |